United States Patent
Jeter, Jr. et al.

(10) Patent No.: US 7,254,687 B1
(45) Date of Patent: Aug. 7, 2007

(54) MEMORY CONTROLLER THAT TRACKS QUEUE OPERATIONS TO DETECT RACE CONDITIONS

(75) Inventors: Robert E. Jeter, Jr., Morrisville, NC (US); Kenneth H. Potter, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 10/320,162

(22) Filed: Dec. 16, 2002

(51) Int. Cl.
*G06F 12/00* (2006.01)

(52) U.S. Cl. .................................... 711/163

(58) Field of Classification Search ............... 711/163
See application file for complete search history.

(56) References Cited

U.S. PATENT DOCUMENTS

| | | | |
|---|---|---|---|
| 4,426,681 A * | 1/1984 | Bacot et al. ............... 711/130 |
| 5,590,304 A * | 12/1996 | Adkisson ................... 711/100 |
| 5,701,434 A * | 12/1997 | Nakagawa .................. 711/157 |
| 5,964,835 A * | 10/1999 | Fowler et al. .............. 709/216 |
| 5,978,574 A * | 11/1999 | Sharma ....................... 703/20 |
| 5,995,486 A * | 11/1999 | Iliadis ........................ 370/229 |
| 6,026,464 A | 2/2000 | Cohen |
| 6,119,215 A | 9/2000 | Key et al. |
| 6,145,061 A * | 11/2000 | Garcia et al. ............... 711/154 |
| 6,178,429 B1 | 1/2001 | Cherf |
| 6,272,621 B1 | 8/2001 | Key et al. |
| 6,574,223 B1 * | 6/2003 | Brueckheimer et al. . 370/395.6 |
| 6,701,425 B1 * | 3/2004 | Dabbagh et al. ............ 712/225 |
| 6,714,553 B1 * | 3/2004 | Poole et al. ................ 370/412 |
| 6,735,677 B1 * | 5/2004 | Stewart ...................... 711/158 |
| 6,738,386 B1 * | 5/2004 | Holmqvist .................. 370/412 |
| 6,769,049 B1 * | 7/2004 | Bernard et al. ............. 711/154 |
| 6,788,697 B1 * | 9/2004 | Aweya et al. ............... 370/412 |
| 2002/0145974 A1 * | 10/2002 | Saidi et al. ................. 370/230 |
| 2003/0065892 A1 * | 4/2003 | Bonola ....................... 711/147 |
| 2003/0097531 A1 * | 5/2003 | Arimilli et al. ............. 711/146 |
| 2003/0140196 A1 * | 7/2003 | Wolrich et al. ............. 711/118 |
| 2005/0055701 A1 * | 3/2005 | Stall ........................... 719/314 |

OTHER PUBLICATIONS

Microsoft Computer Dictionary, 5th Edition, Microsoft Press, 2002, p. 215.*
U.S. Appl. No. 10/320,120, filed Dec. 16, 2002, Robert E. Jeter, Jr. et al.
U.S. Appl. No. 10/217,023, filed Aug. 12, 2002, Robert Jeter.

* cited by examiner

*Primary Examiner*—Matthew Kim
*Assistant Examiner*—Sheng-Jen Tsai
(74) *Attorney, Agent, or Firm*—Cesari and McKenna, LLP

(57) ABSTRACT

A technique for controlling access to resources that may be accessed by one or more entities in a system. According to the technique, an entity accesses a shared resource by issuing a request containing an identifier that identifies the resource and an operation that specifies an operation to be performed on the resource. The operation is compared with one or more outstanding operations associated with the shared resource to determine if the operation conflicts with one or more of the outstanding operations. If a conflict is detected, a guard value is applied to determine if a race condition could occur. If a race condition is detected, the operation is blocked; otherwise, the operation is allowed.

33 Claims, 7 Drawing Sheets

MEMORY CONTROLLER THAT TRACKS QUEUE OPERATIONS TO DETECT RACE CONDITIONS

CROSS-REFERENCE TO RELATED APPLICATIONS

The present invention is related to co-pending and commonly assigned U.S. patent application Ser. No. 10/217,023 titled, Memory Fence With Background Lock Release, filed on Aug. 12, 2002 which is assigned to the assignee of the present invention.

BACKGROUND OF THE INVENTION

1. Field of the Invention

The present invention relates to computer systems and specifically to controlling access to shared resources in a computer system.

2. Background Information

Computer architecture generally defines the functional operation, including the flow of information and control, among individual hardware units of a computer. One such hardware unit is the processor or processing engine, which contains arithmetic and logic processing circuits organized as a set of data paths. In some implementations, the data path circuits may be configured as a central processing unit (CPU) having operations that are defined by a set of instructions. The instructions are typically stored in an instruction memory and specify a set of hardware functions that are available on the CPU.

A high-performance computer may be realized by using a number of CPUs or processors to perform certain tasks in parallel. For a purely parallel multiprocessor architecture, each processor may have shared or private access to resources, such as program instructions (e.g., algorithms) or data structures stored in a memory coupled to the processors. Access to an external memory is generally handled by a memory controller, which accepts memory requests from the various processors and processes them in an order that often is controlled by logic contained in the memory controller. Moreover, certain complex multiprocessor systems may employ many memory controllers where each controller is attached to a separate external memory subsystem.

One place where a parallel, multiprocessor architecture can be advantageously employed involves the area of data communications and, in particular, the forwarding engine for an intermediate network station or node. An intermediate node interconnects communication links and subnetworks of a computer network through a series of ports to enable the exchange of data between two or more software entities executing on hardware platforms, such as end nodes. The nodes typically communicate by exchanging discrete packets or frames of data according to predefined protocols, such as the Transmission Control Protocol/Internet Protocol (TCP/IP) or the Internetwork Packet Exchange (IPX) protocol. The forwarding engine is often used by the intermediate node to process packets received on the various ports. This processing may include determining the destination of a packet, such as an output port, and placing the packet on an output queue associated with the destination.

Intermediate nodes often employ output queues to control the flow of packets placed into the network. In a typical arrangement, the output queues are configured as first-in-first-out (FIFO) queues where packets are placed (enqueued) at the end (tail) of the queues and removed (dequeued) from the beginning (head) of the queue. Placement and removal often entails accessing the queue, which includes writing and reading the packet or information related to the packet, such as a packet header, to and from the queue.

In some systems, packets are enqueued and dequeued by the forwarding engine. In intermediate nodes that employ forwarding engines containing multiple processors, the output queues may be treated as shared resources, meaning that more than one processor can access a given queue at a given time. One problem with shared resources, however, is that certain race conditions may occur when two or more processors attempt to perform conflicting operations on the same resource at the same time. For example, a race condition may occur when a shared queue is empty and a first processor begins to enqueue an element (e.g., a packet header) onto the queue while a second processor accesses the same queue and attempts to dequeue the same element. If the first processor has not completely placed the element on the queue when the second processor begins to dequeue the element, the second processor may end up dequeuing an incomplete element. Another race condition may occur when a shared queue is full and a first processor begins to dequeue an element while a second processor attempts to enqueue an element onto the same queue before the first processor has completely dequeued its element. If the first processor has not completely removed the element from the queue before the second processor begins to place its element on the queue, the second processor may end up overwriting the element being dequeued by the first processor and thus the first processor may end up removing erroneous information.

A prior technique that may be used to avoid race conditions associated with accessing shared resources in a multiprocessing system involves a lock. A lock is an abstraction representing permission to access the resource. Typically, when an entity, such as a processor, wishes to access the shared resource, it obtains "permission" by acquiring the lock before accessing the resource. When the entity finishes accessing the resource the entity releases the lock so that other entities may obtain permission to access the resource. By requiring that the lock be acquired by an entity before the resource is accessed, entities that do not acquire the lock are prevented (locked-out) from interfering with an entity that has acquired the lock.

One problem with locks is that they tend to "serialize" access to resources. This may be troublesome in parallel processing systems, such as multiprocessor systems, where the benefits associated with parallel processing may be greatly diminished due to the serial nature of the locking mechanism. For example, if a processor must wait until another processor releases a lock before it proceeds, the time spent waiting for the lock is time wasted that the processor could have used to perform other useful (parallel) work. Thus, in certain systems, especially parallel processing systems, locking mechanisms may not represent an efficient way to control access to a shared resource.

SUMMARY OF THE INVENTION

The present invention relates to an efficient technique for controlling access to shared resources that may be accessed by one or more entities in a system by allowing or not allowing an operation to be performed on the shared resource. According to the technique, an entity issues a request specifying an operation to be performed on a shared resource. The specified operation is compared with one or more outstanding operations associated with the shared resource to detect a conflict between the request's operation and one or more of the outstanding operations. An operation conflicts with an outstanding operation if both operations are directed to the same resource and the order of the operations must be preserved or "serialized" to ensure proper execution. If a conflict is detected, a guard value associated with the resource is used to detect a race condition between the request's operation and a conflicting outstanding operation. If a race condition could occur (race condition detected), the request's operation is not allowed (access to the resource is blocked); otherwise, the request's operation is allowed (access to the resource is allowed). In this context, the guard value functions to block access to the resource if a race condition can occur. Advantageously, the guard value is used to compensate for latency, which could lead to a race condition between the entities accessing the same resource.

Briefly, in the illustrated embodiment, a processor accesses a queue by issuing a queue request containing a queue operation and a queue identifier. The queue operation specifies an operation, e.g., enqueue or dequeue, to be performed on the queue. The queue identifier is an address of a queue descriptor associated with the queue and is used to identify the queue. The queue descriptor contains attribute information about the queue. The request's queue identifier and queue operation are applied to an outstanding queue operation table to determine if the queue operation conflicts with an outstanding queue operation for the same queue. If a conflict is detected, a guard value associated with the queue is applied to attributes associated with the queue to detect a race condition between the queue operation and a conflicting outstanding operation. If a race condition could occur, the request's operation is not allowed (access to the queue is blocked); otherwise, the request's operation is allowed (access to the queue is allowed).

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
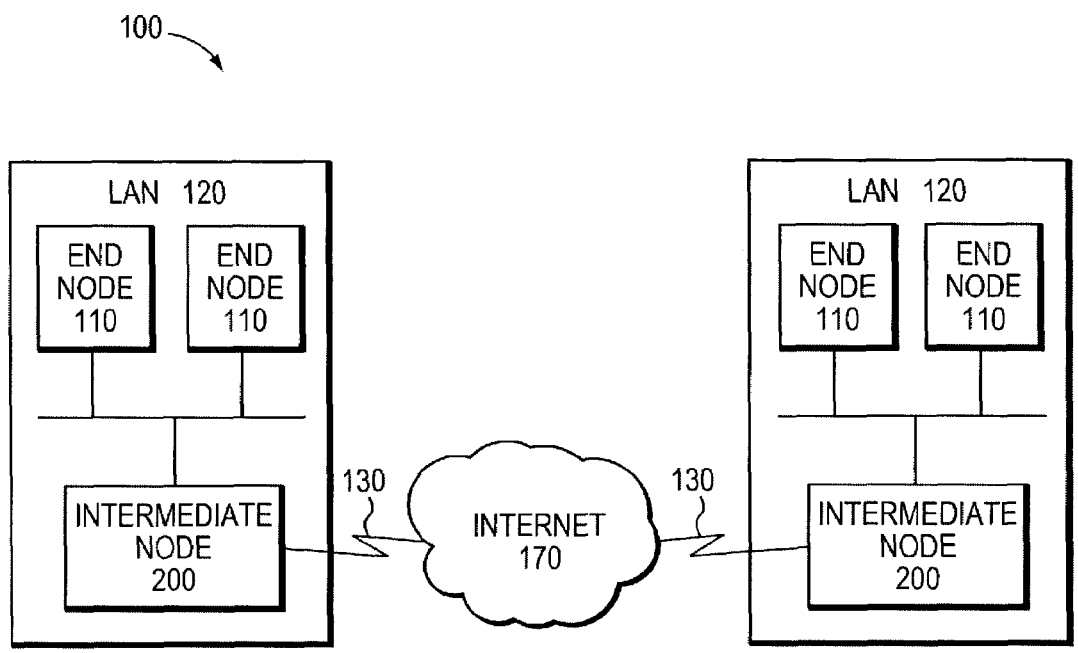
FIG. 1 is a schematic block diagram of a network that may be advantageously used with the present invention.

FIG. 1 is a schematic block diagram of a computer network 100 that may be advantageously used with the present invention. The computer network 100 comprises a collection of communication links and segments connected to a plurality of nodes, such as end nodes 110 and intermediate nodes 200. The network links and segments may comprise local area networks (LANs) 120, wide area networks (WANs) such as Internet 170 and WAN links 130 interconnected by intermediate nodes 200 to form an internet-work of computer nodes. These internetworked nodes communicate by exchanging data packets according to a predefined set of protocols, such as the Transmission Control Protocol/Internet Protocol (TCP/IP) and the Internetwork Packet eXchange (IPX) protocol.

Figure 2:
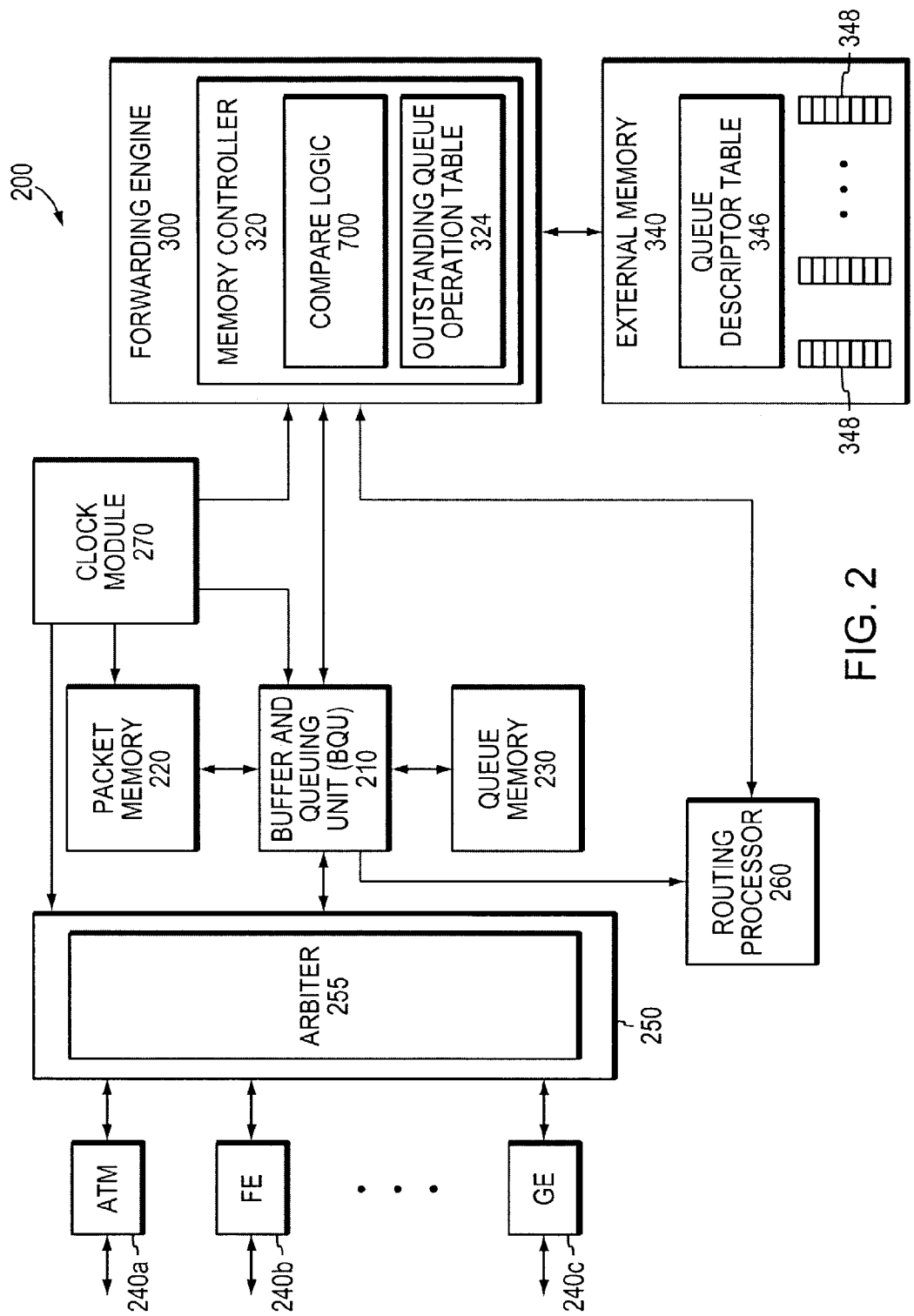
FIG. 2 is a high-level schematic block diagram of an intermediate node that may be advantageously used with the present invention.

FIG. 2 is a high-level schematic block diagram of intermediate node 200, which illustratively is a router. An example of a router that may be advantageously used with the present invention is the Cisco 10000 Series Internet Router available from Cisco Systems Incorporated, San Jose, Calif. Operation of node 200 will be described with respect to Internet Protocol (IP) routing of packets, although node 200 may be programmed for other applications, such as encryption.

Node 200 comprises a plurality of interconnected components including a forwarding engine 300, various memories, queuing logic 210, and network interface cards (line cards) 240. Operations of these components are preferably synchronously controlled by a clock module 270 although the arrayed elements of the forwarding engine 300 may be operatively configured to function asynchronously. In the illustrative embodiment, the clock module 270 generates clock signals at a frequency of, e.g., 200 megahertz (i.e., 5 nanosecond clock cycles), and globally distributes them via clock lines to the components of the intermediate node.

The memories generally comprise random-access-memory (RAM) storage locations addressable by the forwarding engine 300 and logic for storing data structures accessed by the components and software programs including programs that implement aspects of the present invention. An operating system, portions of which are typically resident in memory and executed by the forwarding engine 300, functionally organizes node 200 by, inter alia, invoking network operations in support of software processes executing on node 200. It will be apparent to those skilled in the art that other memory means, including various computer readable media, may be used for storing and executing program instructions pertaining to the inventive technique and mechanism described herein.

The buffer and queuing unit (BQU) 210 is connected to a packet memory 220 for storing packets and a queue memory 230 for storing network and link layer headers of the packets on data structures, such as linked lists, organized as queues. The BQU 210 further comprises interface circuitry for interconnecting the forwarding engine 300 with a plurality of line cards 240 via a selector circuit 250 having an arbiter 255. The line cards 240 may comprise, e.g., Asynchronous Transfer Mode (ATM), Fast Ethernet (FE) and Gigabit Ethernet (GE) ports, each of which includes conventional interface circuitry that may incorporate the signal, electrical and mechanical characteristics, and interchange circuits, needed to interface with the physical media and protocols running over that media.

A routing processor 260 executes conventional routing protocols for communication directly with the forwarding engine 300. The routing protocols generally comprise topological information exchanges between intermediate nodes to determine preferred paths through the network based on, e.g., destination IP addresses. These protocols provide information used by the processor 260 to create and maintain forwarding tables. The tables are loaded into the external memories 340 as forwarding information base (FIB) tables, used by the engine 300 to perform, e.g., layer-2 (L2) and layer-3 (L3) forwarding operations. When processing a header in accordance with IP routing, for example, engine 300 determines where to send the packet by indexing into the FIB using an IP address of the header. Execution of the forwarding operations results in destination media access control (MAC) addresses of the headers being rewritten by the forwarding engine 300 to identify output ports for the packets.

Figure 3:
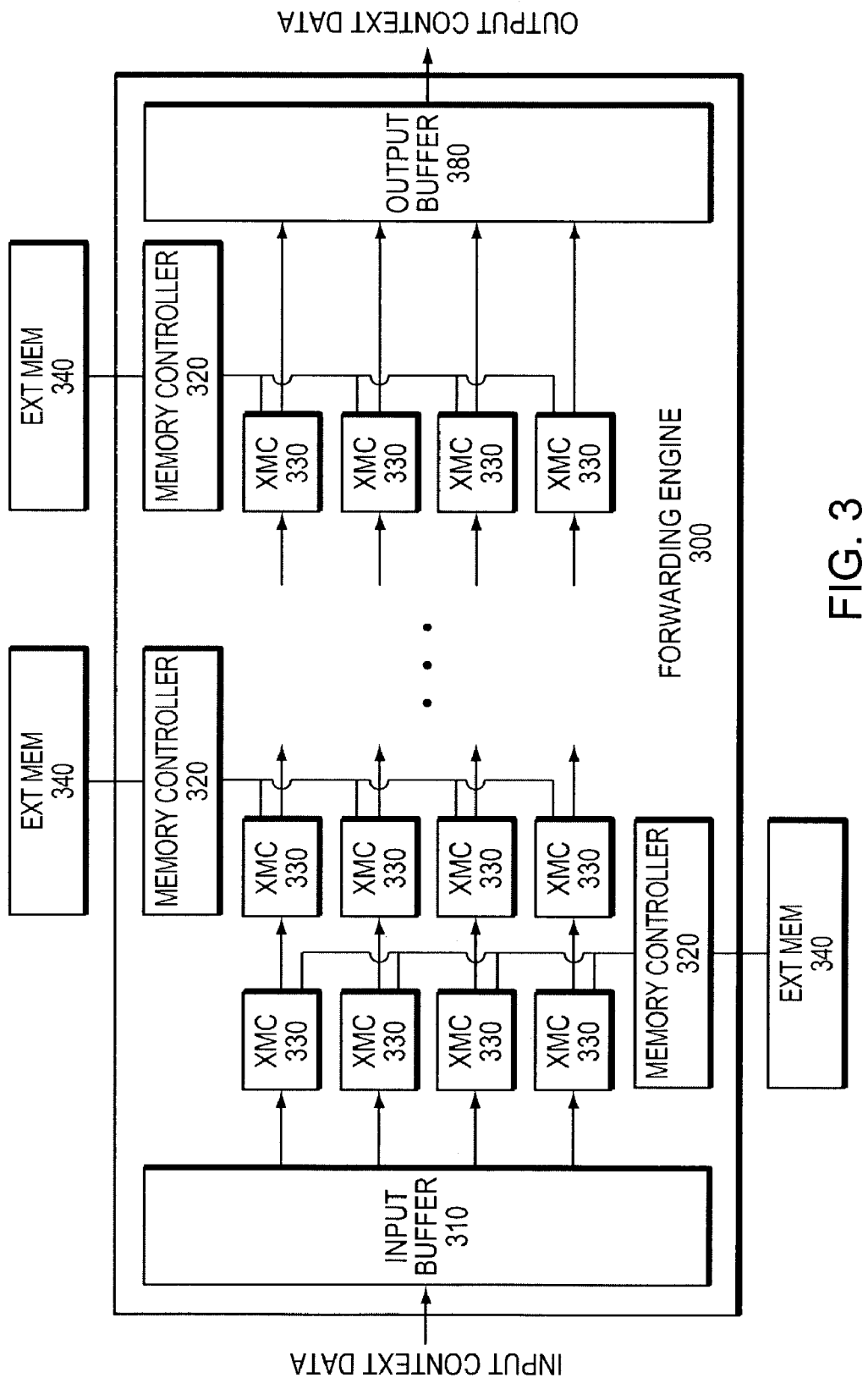
FIG. 3 is a partial schematic block diagram of a forwarding engine comprising a plurality of processing elements organized as a multi-dimensional systolic array that may be advantageously used with the present invention.

The forwarding engine 300 may comprise a symmetric multiprocessor system having a plurality of processing elements or processors. FIG. 3 is a partial schematic block diagram of forwarding engine 300 comprising a plurality of processing elements (XMCs) 330 organized as a multi-dimensional systolic array. Each processing element 330 is illustratively a pipelined processor that includes, inter alia, a plurality of arithmetic logic units (ALUs) and a register file having a plurality of general purpose registers that store intermediate result information processed by the ALUs. The processors 330 may be arrayed into multiple rows and columns. In the illustrative embodiment, the processors are arrayed as four (4) rows and eight (8) columns in a 4×8 arrayed configuration that is embedded between an input buffer 310 and an output buffer 380. However, it should be noted that other arrangements, such as 4×4, 8×2, or 8×1 arrayed configurations, might be advantageously used with the present invention. As noted herein, a single processor supporting multiple threads of execution can take advantage of the invention.

The processors 330 of each row are configured as a "pipeline" to sequentially execute operations on transient data (e.g., packet headers), also herein referred to as context data, whereas the processors 330 of each column operate in parallel to perform substantially the same operation on the transient data, but with a shifted phase. Each phase comprises a predetermined period of cycles, e.g., 128 cycles. Sequencing circuitry controls the processors 330 of each pipeline by ensuring that each processor 330 completes processing of current transient data before loading new transient data into the pipeline at a new phase. In general, a new phase of processing is started, i.e., a context switch is performed, when all of the processors 330 finish processing their current context and new, incoming context is completely received.

The forwarding engine 300 is coupled to a plurality of external memory (Ext Mem) resources 340 via memory controllers 320. Each memory controller contains compare logic 700 and an outstanding queue operation table 324. The compare logic 700 comprises logic that generates an applied guard value in accordance with the inventive technique. The outstanding queue operation table 324 contains one or more entries wherein each entry is associated with a processor 330 and holds information about an outstanding queue operation associated with the processor 330. The external memory 340 is preferably organized as one or more banks and implemented using fast-cycle-random-access-memory (FCRAM) devices, although other devices, such as reduced-latency-dynamic-random-access-memory (RLDRAM) devices, could be used. The external memory 340 stores non-transient data (e.g., forwarding tables, queues) organized as a series of data structures for use in processing the transient data. These data structures include a queue descriptor table 346, and one or more queues 348. The queue descriptor table 346 contains one or more entries where each entry is associated with a queue 348 and holds various information about the queue.

Figure 4:
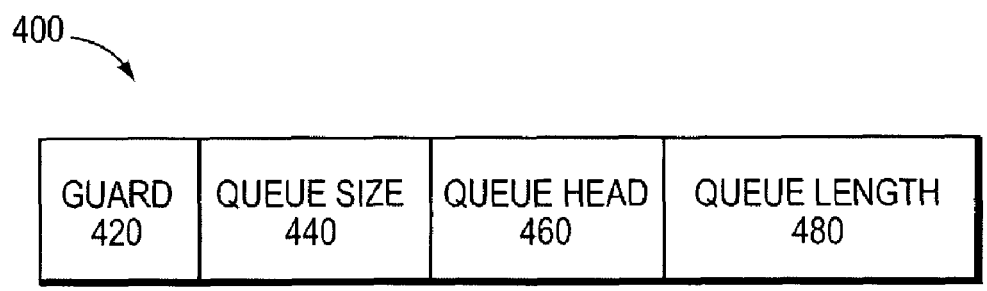
FIG. 4 is a schematic block diagram of a queue descriptor table entry that may be advantageously used with the present invention.

Queues 348 are preferably fixed-sized circular first-in-first-out (FIFO) queues comprising a plurality of elements addressable by an index. Each queue 348 is associated with a queue descriptor entry contained in the queue descriptor table 346. FIG. 4 is a schematic block diagram of a queue descriptor entry 400 that may be advantageously used with the present invention. Queue descriptor entry 400 (hereinafter "queue descriptor 400") comprises attribute information about its associated queue including a guard field 420, a queue size field 440, a queue head field 460, and a queue length field 480. The queue size field 440 holds a value that indicates the maximum size of the queue, e.g., the maximum number of entries contained in the queue. The queue head 460 and length 480 fields hold the address (index value) of the head of the queue and the number of entries in the queue, respectively. The guard field 420 holds a guard value that is used to, inter alia, detect race conditions and prevent queue requests from interfering is with outstanding queue operations issued by other processors.

Figure 5:
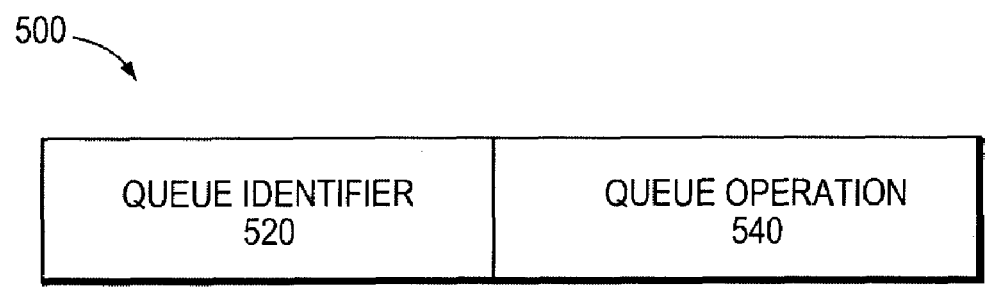
FIG. 5 is a schematic block diagram of an outstanding queue operation table entry that may be advantageously used with the present invention.

FIG. 5 is a schematic block diagram of an outstanding queue operation table entry that may be advantageously used with the present invention. Entry 500 represents an outstanding operation associated with a queue 348 and contains a queue identifier field 520 that holds an address that identifies the queue descriptor 400 associated with the queue 348. An operation field 540 holds a queue operation (e.g., enqueue, dequeue) that is representative of the outstanding operation being performed on the queue 348.

The present invention relates to a technique for controlling access to shared resources that may be accessed by one or more entities, such as processors, in a system. According to the inventive technique, an entity issues a request specifying an operation to be performed on the shared resource. The request's operation is compared with outstanding operations associated with the same resource to determine if the request's operation conflicts with an outstanding operation. An operation conflicts with an outstanding operation if both operations are directed to the same resource and the order of the operations must be preserved or "serialized" to ensure proper execution. If a conflict is detected, a guard value associated with the resource is used to detect a race condition between the request's operation and a conflicting outstanding operation. If a race condition could occur, the request's operation is not allowed; otherwise, the operation is allowed.

In the illustrated embodiment, processors 330 issue queue requests to the memory controller 320 to access the queues including placing (enqueuing) or removing (dequeuing) elements to and from the queues 348. The queue requests specify a queue operation, such as an enqueue or dequeue, and a queue identifier that illustratively is the address of the queue descriptor 400 associated with the queue 348. The request's queue operation is compared with all outstanding operations for the queue associated with the queue identifier. If a conflict is detected with an outstanding queue operation, a guard value contained in field 420 of the queue's descriptor is applied to determine if a race condition could occur. If a race condition could occur, a queue full or queue empty condition is returned to the processor 330 depending on the operation. If a race condition is not detected, the request is allowed and considered "outstanding." A copy of the outstanding request is maintained in an outstanding queue operation table entry 500 associated with the processor. Subsequently, when the processor 330 has finished with the queue, it issues a request to release the queue to the controller 320. The controller 320 releases the queue by clearing the entry 500 associated with the processor 330 in the outstanding queue operation table 324.

Figure 6:
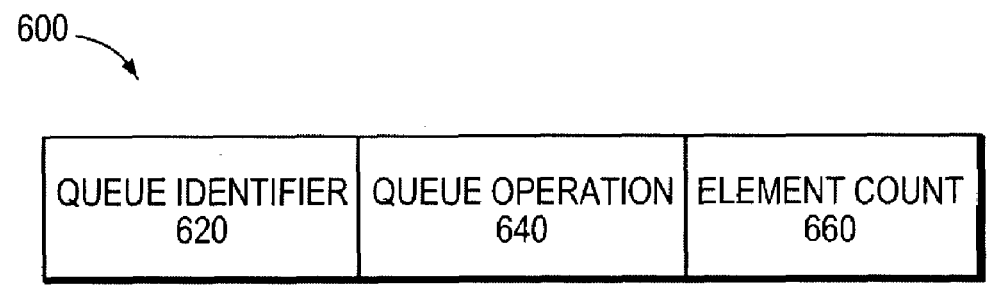
FIG. 6 is a schematic block diagram of a queue request that may be advantageously used with the present invention.

FIG. 6 is a partial schematic block diagram of a queue request that may be advantageously used with the present invention. Request 600 comprises a queue identifier 620, a queue operation 640, and an element count 660. The queue identifier field 620 holds the address of the queue descriptor 400 associated with the queue 348 to be accessed. The queue operation field 640 holds a queue operation (e.g., enqueue, dequeue) that is to be performed on the queue 348. The element count field 660 holds the number of elements to be enqueued or dequeued to or from the queue.

In response to receiving a queue request 600, the memory controller 320 compares the request's operation 640 with outstanding operations associated with the queue to determine if the operation conflicts with one or more of the outstanding operations. Such comparison and determination are performed by applying the request's queue operation 640 and queue identifier 620 to table 324 to (i) locate entries 500 in table 324 whose queue identifier 540 matches the request's queue identifier 620 and, (ii) for those entries that match, determine if the queue operation 540 in the matching entry conflicts with the request's queue operation 640. If a conflict is detected, an applied guard value is set to the guard value 420 associated with the queue; otherwise, the applied guard value is set to indicate no guard value. The applied guard value is then used to determine if a race condition could occur.

Figure 7:
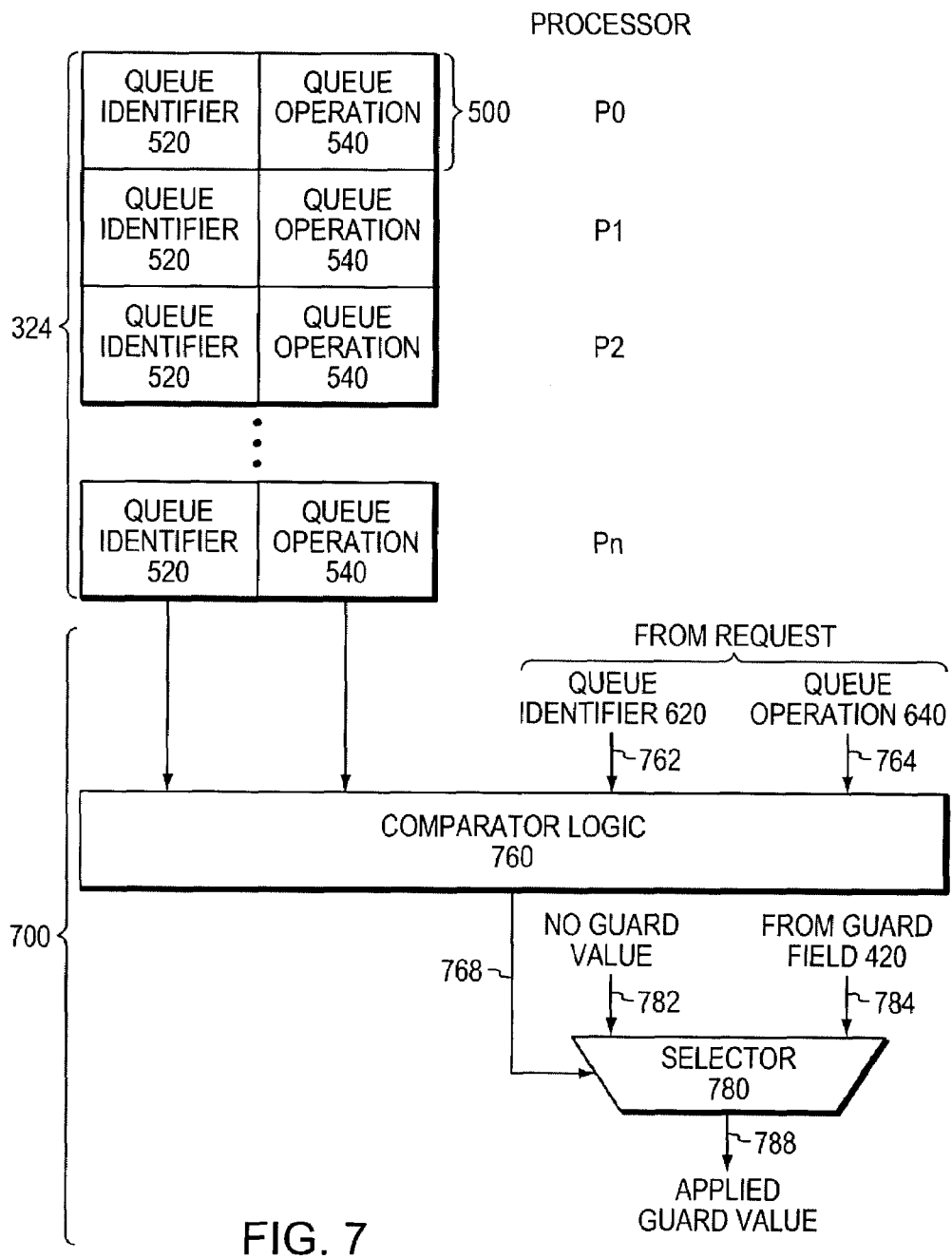
FIG. 7 is a partial schematic block diagram of logic that may be used to determine the guard value applied for a given queue request in accordance with the inventive technique.

FIG. 7 is a partial schematic block diagram of compare logic 700 that can be used to determine the applied guard value for a queue request 600 in accordance with the inventive technique. Logic 700 comprises a comparator 760 and a selector 780. The outstanding queue operation table entries 500, along with the queue identifier 620 and queue operation 640 of request 600, are provided as inputs to the comparator 760, which determines if the request's operation 640 conflicts with an outstanding queue operation 540 for the same queue. Specifically, for those outstanding queue operation table entries whose queue identifier 520 matches the request's queue identifier 620, the comparator 760 detects a conflict between a matching entry's queue operation 540 and the request's queue operation 640. As noted above, an operation conflicts with an outstanding operation if both operations are directed to the same resource and the order of the operations must be preserved or "serialized" to ensure proper execution. For example, a request that specifies a dequeue operation conflicts with a matching outstanding entry that specifies an enqueue operation because in order to ensure proper execution the outstanding enqueue operation must complete before the dequeue operation.

If a conflicting operation is detected, comparator logic 760 generates a signal 768 that configures selector 780 to select the guard value 420 from the queue's descriptor entry 400. Otherwise, if a conflict is not detected, comparator logic 760 generates a signal that configures selector 780 to select no guard value (e.g., zero). The guard value selected is the applied guard value 788 that is provided at an output of selector 780.

Figure 8:
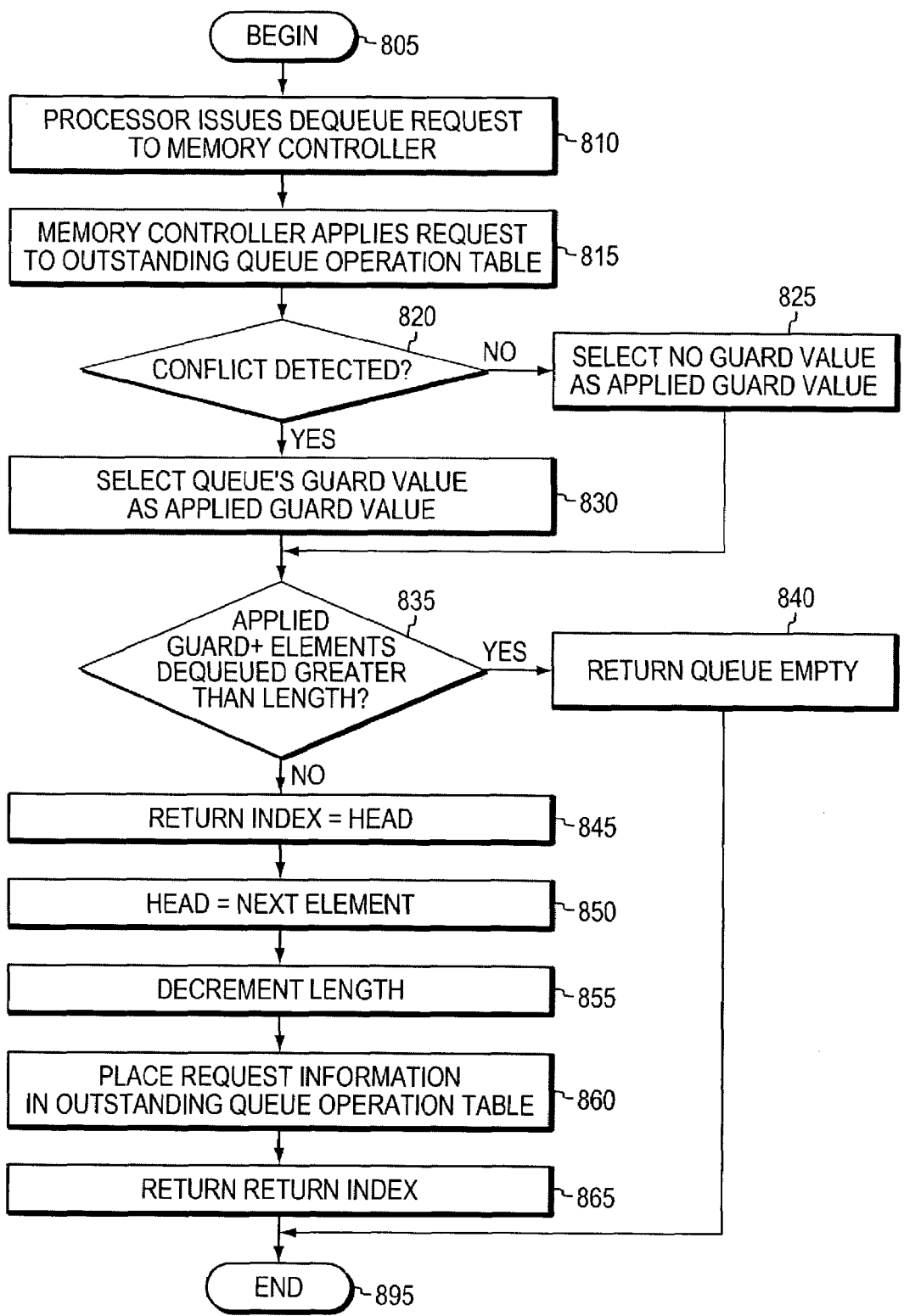
FIG. 8 is a flow diagram of a sequence of steps that may be used to process a dequeue operation in accordance with the inventive technique.

As noted above, a processor 330 removes information from a queue 348 by issuing a queue request containing a dequeue operation. FIG. 8 is a flowchart of a sequence of steps that may be used to process a queue request containing a dequeue operation in accordance with the present invention. The sequence begins at Step 805 and proceeds to Step 810 where a processor 330 issues a queue request 600 to the memory controller 320 containing a dequeue operation in the queue operation field 640, the number elements to dequeue in the element count field 660, and the address of the queue's queue descriptor 400 in the queue identifier field 620. The memory controller 320 receives the request 600 and processes it including comparing the request's queue operation 640 and identifier 620 with the outstanding queue operation entries 500 in table 324, in a manner as described above, to detect a conflict between the request's operation 640 and a matching outstanding operation 540 (Steps 815, 820).

If a conflict is not detected, selector 780 is configured to select no guard value (Step 825), e.g., zero, as the applied guard value and the sequence proceeds to Step 835. Otherwise if a conflict is detected, at Step 830, selector 780 is configured to select the queue's guard value 420 as the applied guard value. At Step 835, memory controller 320 determines if a race condition could occur by applying the applied guard value 788 to attributes associated with the queue. Specifically, memory controller 320 combines the applied guard value 788 with the number of elements dequeued 660 and compares the result with the queue's length 480. If the result exceeds the queue's length 480, a race condition is detected, the operation 640 is not allowed and the sequence proceeds to Step 840, where a queue empty condition is returned to the processor 330, and then to Step 895 where the sequence ends. Otherwise, the operation 640 is allowed and the sequence proceeds to Step 845 where a return-index value is set to the index value of the element at the head of the queue, e.g., the index value contained in the queue's queue head field 460. Next, the queue head field 460 is updated to contain the index value of the next element in the queue (Step 850). In the illustrative embodiment, the index value of the next element may be calculated using the following formula:

$$\text{next\_element\_index} = (\text{queue\_head} + \text{number\_of\_elements\_dequeued}) \, \% \, \text{queue\_size}$$

wherein:

"%" denotes the modulus operator;

next_element_index is an index value associated with the queue's next element;

queue_head is an index value of the element at the queue's head (e.g., the contents of the queue's queue head field 460);

number_of_elements_dequeued is a value that represents the number of elements dequeued by the dequeue operation (e.g., the contents of the request's element count field 660); and queue_size is a value that represents the maximum number elements that can be placed in the queue (e.g., the contents of the queue's queue size field 440).

At Step 855, the memory controller 320 decrements the queue's length 480 to account for the elements dequeued, e.g., decreases the queue length 480 by the element count 660 specified in the request. The memory controller then places the request's queue identifier 620 and queue operation 640 in the queue identifier 520 and queue operation 540 fields of the entry 500 associated with the processor, respectively (Step 860). Next, at Step 865, the memory controller 320 returns the return-index value to the processor and the sequence ends (Step 895).

Figure 9:
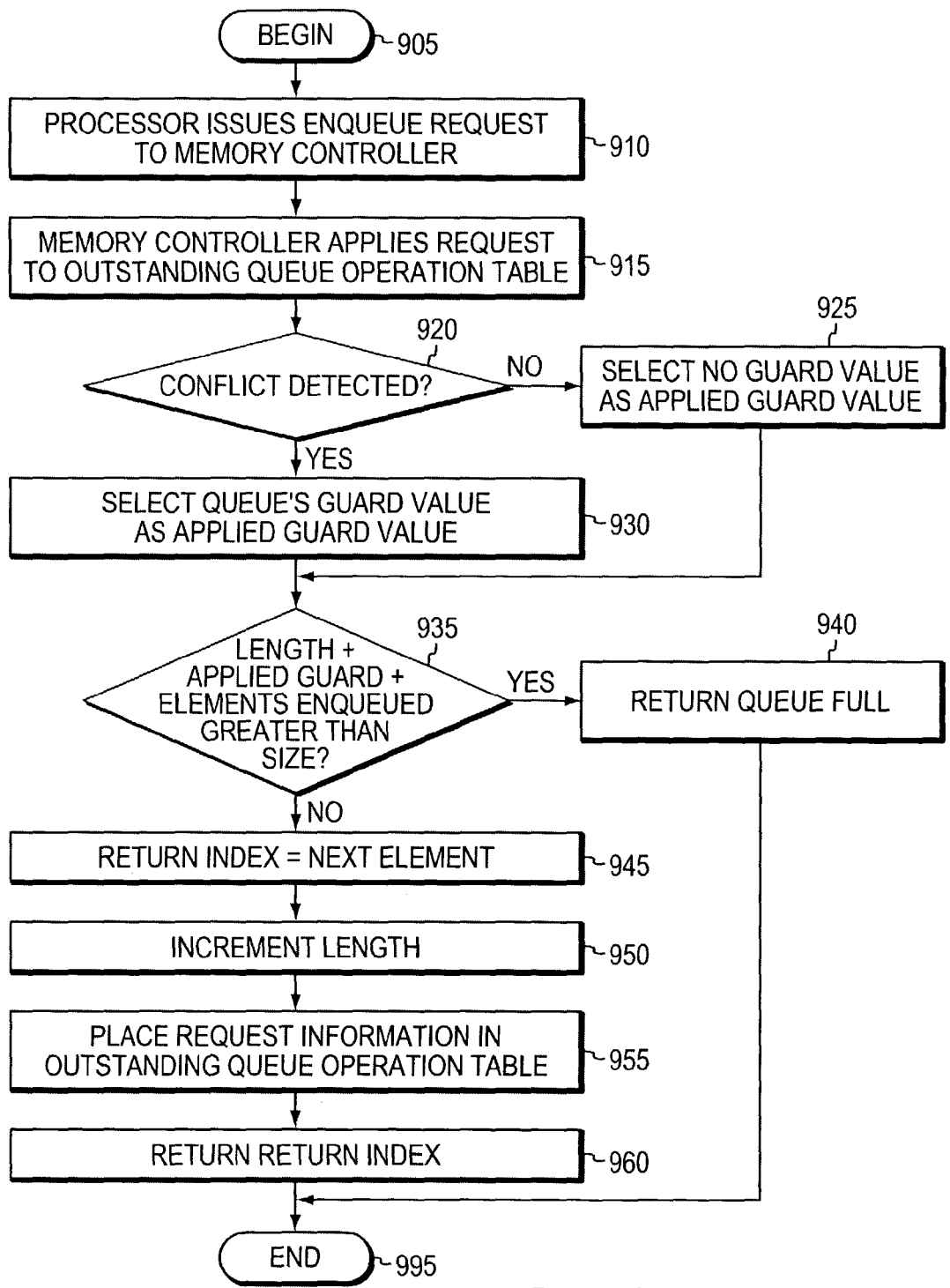
FIG. 9 is a flow diagram of a sequence of steps that may be used to process an enqueue operation in accordance with the inventive technique.

As noted above, a processor 330 places information on a queue 348 by issuing a queue request containing an enqueue operation. FIG. 9 is a flowchart of a sequence of steps that may be used to process a queue request 600 containing an enqueue operation in accordance with the present invention. The sequence begins at Step 905 and proceeds to Step 910 where a processor 330 issues a queue request 600 to the memory controller 320 containing an enqueue operation in the queue operation field 640, the number elements to dequeue in the element count field 660, and the address of the queue's queue descriptor 400 in the queue identifier field 620.

At Step 915, the memory controller 320 compares the request's queue identifier 620 and queue operation 640 with the outstanding queue operation table entries 500 in table 324, in a manner as described above, to detect a conflict between the request's operation 640 and a matching outstanding operation 540 (Step 920). If a conflict is not detected, selector 780 is configured to select no guard value (Step 925), e.g., zero, as the applied guard value 788 and the sequence proceeds to Step 935. Otherwise if a conflict is detected, at Step 930, selector 780 is configured to select the queue's guard value 420 as the applied guard value 788.

At Step 935, the memory controller 320 applies the guard value 788 to various queue attributes and information in the request 600 to determine if a race condition could occur. Specifically, memory controller 320 combines the queue's length 480 and the applied guard value 788, with the number of elements enqueued 660 and compares the result with the queue's size 440. If the result is greater than the queue's size 440, a race condition is detected, the operation 640 is not allowed and the sequence proceeds to Step 940, where a queue full indication is returned to the processor 330, and Step 995 where the sequence ends. Otherwise, the operation 640 is allowed and the sequence proceeds to Step 945 where a return-index value is set to the index value of the next element in the queue. In the illustrated embodiment, the index value associated with the next element for an enqueue operation may be determined using the following formula:

$$\text{next\_element\_index} = (\text{queue\_head} + \text{queue\_length}) \% \text{queue\_size}$$

wherein:

"%" denotes the modulus operator;

next_element_index is an index value associated with the queue's next element;

queue_head is an index value of the element at the queue's head (e.g., the contents of the queue's queue head field 460);

queue_length is a value that represents the number of elements placed in the queue (e.g., the contents of the queue's queue length field 480); and queue_size is a value that represents the maximum number elements that can be placed in the queue (e.g., the contents of the queue's queue size field 440).

The memory controller 320, at Step 950, increments the queue's length 480 by the number of elements enqueued 660, e.g., increases the queue length 480 by the element count 660 specified in the request. The memory controller 320 then places the request's queue identifier 620 and operation 640 in the queue identifier 520 and queue operation 540 fields of the entry 500 associated with the processor, as indicated at Step 955. At Step 960, the memory controller 320 returns the return-index value to the processor 330 and the sequence ends at Step 995.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for processing a request including an enqueue operation directed to a queue, the method comprising:

comparing a memory address associated with the enqueue operation to one or more memory addresses associated with outstanding requests;

in response to the memory address associated with the enqueue operation matching one of the one or more memory addresses associated with outstanding dequeue requests, adding a guard value to the number of elements currently in the queue, to create a sum;

comparing the sum to a maximum number of elements that can be placed in the queue;

if the sum is greater than the maximum number of elements, detecting a race condition and preventing the enqueue operation from executing; and if the sum is less than the maximum number of elements, determining a race condition will not occur and allowing the enqueue operation.

2. The method of claim 1, further comprising:

in response to the memory address associated with the enqueue operation not matching any of the one or more memory addresses associated with outstanding requests, setting the guard value to zero and then adding the guard value to the number of elements currently in the queue, to create the sum.

3. The method of claim 1, further comprising:

adding the guard value and the number of elements currently in the queue to the number of elements to be enqueued by the request, to create the sum.

4. The method of claim 3, further comprising:

providing a queue descriptor table that includes entries for storing the guard value, the number of elements currently in the queue, and the maximum number of elements that can be placed in the queue.

5. A method for processing a request including a dequeue operation directed to a queue, the method comprising:

comparing a memory address associated with the dequeue operation to one or more memory addresses associated with outstanding requests;

in response to the memory address of the dequeue operation matching one of the one or more memory addresses associated with outstanding enqueue requests, adding a guard value to the number of elements to be dequeued by the request, to create a sum;

comparing the sum to the number of elements currently in the queue;

if the sum is greater than the number of elements currently in the queue, detecting a race condition and preventing the dequeue operation from executing; and if the sum is less than the number of elements currently in the queue, determining a race condition will not occur and allowing the dequeue operation.

6. The method of claim 5, further comprising:

in response to the memory address associated with the dequeue operation not matching any of the one or more memory addresses associated with outstanding requests, setting the guard value to zero and then adding the guard value to the number of elements to be dequeued by the request, to create the sum.

7. The method of claim 5 further comprising:
providing a queue descriptor table that includes entries for storing the guard value and the number of elements currently in the queue.

8. An apparatus for processing a request including an enqueue operation directed to a queue, the apparatus comprising:
compare logic configured to compare a memory address associated with the enqueue operation to one or more memory addresses associated with outstanding requests;
a memory controller configured to, in response to the compare logic signaling that the memory address associated with the enqueue operation matches one of the one or more memory addresses associated with outstanding dequeue requests, add a guard value to the number of elements currently in the queue, to create a sum; and
the memory controller configured to compare the sum to a maximum number of elements that can be placed in the queue, and if the sum is greater than the maximum number of elements, to detect a race condition and prevent the enqueue operation from executing, and if the sum is less than the maximum number of elements, to determine a race condition will not occur and allow the enqueue operation.

9. The apparatus of claim 8 wherein the memory controller adds the guard value and the number of elements currently in the queue to the number of elements to be enqueued by the request, to create the sum.

10. The apparatus of claim 9, further comprising:
a queue descriptor table that includes entries for storing the guard value, the number of elements currently in the queue, and the maximum number of elements that can be placed in the queue.

11. An apparatus for processing a request including a dequeue operation directed to a queue, the apparatus comprising:
compare logic configured to compare a memory address associated with the dequeue operation to one or more memory addresses associated with outstanding requests;
a memory controller configured to, in response to the compare logic signaling the memory address associated with the dequeue operation matches one of the one or more memory addresses associated with outstanding enqueue requests, add a guard value to the number of elements to be dequeued by the request, to create a sum; and
the memory controller further configured to compare the sum to the number of elements currently in the queue, and if the sum is greater than the number of elements currently in the queue, detect a race condition and prevent the dequeue operation from executing, and if the sum is less than the number of elements currently in the queue, determine a race condition will not occur and allow the dequeue operation.

12. The apparatus of claim 11 further comprising:
a queue descriptor table that includes entries for storing the guard value and the number of elements currently in the queue.

13. An apparatus for processing a request including an enqueue operation directed to a queue, the apparatus comprising:
means for comparing a memory address associated with the enqueue operation to one or more memory addresses associated with outstanding requests;
means for adding a guard value to the number of elements currently in the queue to create a sum, in response to the memory address associated with the enqueue operation matching one of the one or more memory addresses associated with outstanding dequeue requests;
means for comparing the sum to a maximum number of elements that can be placed in the queue;
means for detecting a race condition and preventing the enqueue operation from executing, if the sum is greater than the maximum number of elements; and
means for determining a race condition will not occur and allowing the enqueue operation, if the sum is less than the maximum number of elements.

14. The apparatus of claim 13, further comprising:
means for setting the guard value to zero and then adding the guard value to the number of elements currently in the queue, to create the sum, in response to the memory address associated with the enqueue operation not matching any of the one or more memory addresses associated with outstanding requests.

15. The apparatus of claim 13, further comprising:
means for adding the guard value and the number of elements currently in the queue to the number of elements to be enqueued by the request, to create the sum.

16. The apparatus of claim 15, further comprising:
means for storing the guard value, the number of elements currently in the queue, and the maximum number of elements that can be placed in the queue.

17. An apparatus for processing a request including a dequeue operation directed to a queue, the apparatus comprising:
means for comparing a memory address associated with the dequeue operation to one or more memory addresses associated with outstanding requests;
means for adding a guard value to the number of elements to be dequeued by the request to create a sum, in response to the memory address of the dequeue operation matching one of the one or more memory addresses associated with an outstanding enqueue requests;
means for comparing the sum to the number of elements currently in the queue;
means for detecting a race condition and preventing the dequeue operation from executing, if the sum is greater than the number of elements currently in the queue; and
means for determining a race condition will not occur and allowing the dequeue operation if the sum is less than the number of elements currently in the queue.

18. The apparatus of claim 17, further comprising:
means for setting the guard value to zero and then adding the guard value to the number of elements to be dequeued by the request, to create the sum, in response to the memory address associated with the dequeue operation not matching any of the one or more memory addresses associated with outstanding requests.

19. The apparatus of claim 17 further comprising:
means for storing the guard value and the number of elements currently in the queue.

20. A computer-readable medium comprising program instructions for execution on a processor, the program instructions for performing the steps of:
comparing a memory address associated with an enqueue operation on a queue to one or more memory addresses associated with outstanding requests;
in response to the memory address associated with the enqueue operation matching one of the one or more memory addresses associated with outstanding dequeue requests, adding a guard value to the number of elements currently in the queue, to create a sum;

comparing the sum to a maximum number of elements that can be placed in the queue;

if the sum is greater than the maximum number of elements, detecting a race condition and preventing the enqueue operation from executing; and if the sum is less than the maximum number of elements, determining a race condition will not occur and allowing the enqueue operation.

21. A computer-readable medium comprising program instructions for execution on a processor, the program instructions for performing the steps of:

comparing a memory address associated with a dequeue operation on a queue to one or more memory addresses associated with outstanding requests;

in response to the memory address of the dequeue operation matching one of the one or more memory addresses associated with outstanding enqueue requests, adding a guard value to the number of elements to be dequeued by the request, to create a sum;

comparing the sum to the number of elements currently in the queue;

if the sum is greater than the number of elements currently in the queue, detecting a race condition and preventing the dequeue operation from executing; and if the sum is less than the number of elements currently in the queue, determining a race condition will not occur and allowing the dequeue operation.

22. A method comprising:

comparing a request including an enqueue operation to one or more outstanding requests in a queue and to determine if the request conflicts with the one or more outstanding requests in the queue;

in response to the request conflicting with the one or more outstanding requests in the queue, adding a guard value to the number of elements currently in the queue, to create a sum;

comparing the sum to a maximum number of elements that can be placed in the queue;

if the sum is greater than the maximum number of elements, determining a race condition will occur and preventing the enqueue operation from executing; and if the sum is less than the maximum number of elements, determining a race condition will not occur and allowing the enqueue operation.

23. The method of claim 22, further comprising:

in response to the request not conflicting with the one or more outstanding requests in the queue, setting the guard value to zero and then adding the guard value to the number of elements currently in the queue, to create the sum.

24. The method of claim 22, further comprising:

adding the guard value and the number of elements currently in the queue to the number of elements to be enqueued by the request, to create the sum.

25. The method of claim 24, further comprising:

using a queue descriptor table to store the guard value, the number of elements currently in the queue, and the maximum number of elements that can be placed in the queue.

26. A method comprising:

comparing a request including a dequeue operation to one or more outstanding requests in a queue and to determine if the request conflicts with the one or more outstanding requests in the queue;

in response to the request conflicting with the one or more outstanding requests in the queue, adding a guard value to the number of elements to be dequeued by the request, to create a sum;

comparing the sum to the number of elements currently in the queue;

if the sum is greater than the number of elements currently in the queue, determining a race condition will occur and preventing the dequeue operation from executing; and if the sum is less than the number of elements currently in the queue, determining a race condition will not occur and allowing the dequeue operation.

27. The method of claim 26, further comprising:

in response to the request not conflicting with the one or more outstanding requests in the queue, setting the guard value to zero and then adding the guard value to the number of elements to be dequeued by the request, to create the sum.

28. The method of claim 26 further comprising:

using a queue descriptor table to store the guard value and the number of elements currently in the queue.

29. An apparatus comprising:

compare logic configured to compare a request including an enqueue operation to one or more outstanding requests in a queue and to determine if the request conflicts with the one or more outstanding requests in the queue;

a memory controller configured to, in response to the compare logic determining the request conflicts, add a guard value to the number of elements currently in the queue, to create a sum; and the memory controller configured to compare the sum to a maximum number of elements that can be placed in the queue, and if the sum is greater than the maximum number of elements, to determine a race condition will occur and prevent the enqueue operation from executing, and if the sum is less than the maximum number of elements, to determine a race condition will not occur and allow the enqueue operation.

30. The apparatus of claim 22 wherein the memory controller adds the guard value and the number of elements currently in the queue to the number of elements to be enqueued by the request, to create the sum.

31. The apparatus of claim 30 further comprising:

a queue descriptor table that includes entries for storing the guard value, the number of elements currently in the queue, and the maximum number of elements that can be placed in the queue.

32. An apparatus comprising:

compare logic configured to compare a request including an dequeue operation to one or more outstanding requests in a queue and to determine if the request conflicts with the one or more outstanding requests in the queue;

a memory controller configured to, in response to the compare logic determining the request conflicts, add a guard value to the number of elements to be dequeued by the request, to create a sum; and the memory controller further configured to compare the sum to the number of elements currently in the queue; and if the sum is greater than the number of elements currently in the queue, determine a race condition will occur and prevent the dequeue operation from executing, and if the sum is less than the number of elements currently in the queue, determine a race condition will not occur and allow the dequeue operation.

33. The apparatus of claim 32 further comprising:

a queue descriptor table that includes entries for storing the guard value and the number of elements currently in the queue.

* * * * *

UNITED STATES PATENT AND TRADEMARK OFFICE
CERTIFICATE OF CORRECTION

| | |
|---|---|
| PATENT NO. | : 7,254,687 B1 |
| APPLICATION NO. | : 10/320162 |
| DATED | : August 7, 2007 |
| INVENTOR(S) | : Robert E. Jeter, Jr. |

Page 1 of 1

It is certified that error appears in the above-identified patent and that said Letters Patent is hereby corrected as shown below:

Col. 6, Line 24, replace "interfering is with" with "interfering with"

Signed and Sealed this

Twenty-third Day of November, 2010

David J. Kappos
*Director of the United States Patent and Trademark Office*